(12) United States Patent
Rancuret et al.

(10) Patent No.: US 8,253,091 B2
(45) Date of Patent: Aug. 28, 2012

(54) DATA INTERFACE FOR AN OPTICAL DEVICE HAVING A CONTROLLER RECEIVING IMAGE PIXEL STATE DATA OVER AN OPTICAL LINK FROM A SOURCE OF CONTROL-MODULATED LIGHT

(75) Inventors: Paul Rancuret, Plano, TX (US); Sajjad Khan, Plano, TX (US); Hector Rodriguez, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 307 days.

(21) Appl. No.: 12/535,003

(22) Filed: Aug. 4, 2009

(65) Prior Publication Data

US 2010/0245683 A1 Sep. 30, 2010

Related U.S. Application Data

(60) Provisional application No. 61/163,656, filed on Mar. 26, 2009.

(51) Int. Cl.
*H01L 27/00* (2006.01)
(52) U.S. Cl. .................................. 250/208.1; 250/205
(58) Field of Classification Search ............... 250/208.1, 250/216, 214 R, 221, 205; 359/290–298, 359/224; 345/31, 84; 353/119
See application file for complete search history.

(56) References Cited

U.S. PATENT DOCUMENTS 6,686,602 B2 * 2/2004 Some .................. 250/559.45
7,459,333 B2 * 12/2008 Richards et al. .............. 438/66

* cited by examiner

*Primary Examiner* — Que T Le
(74) *Attorney, Agent, or Firm* — Warren L. Franz; Wade J. Brady, III; Frederick J. Telecky, Jr.

(57) ABSTRACT

An optical device includes an array of optical elements located over a package substrate. A controller is also located over the package substrate. The controller is operable to control an operational state of the array in response to an optical signal detected by an optical receiver.

20 Claims, 11 Drawing Sheets

Figure 1:
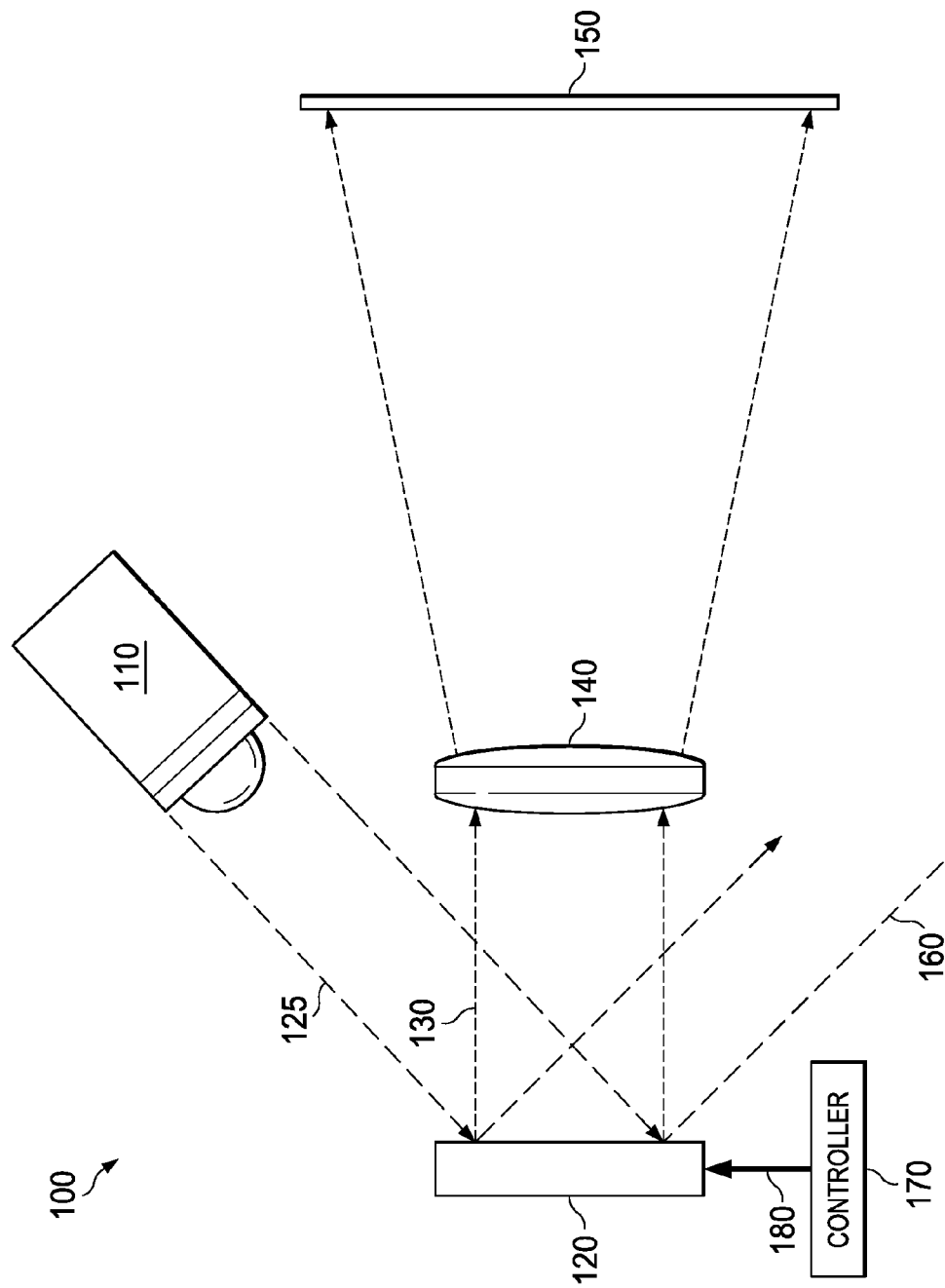

DATA INTERFACE FOR AN OPTICAL DEVICE HAVING A CONTROLLER RECEIVING IMAGE PIXEL STATE DATA OVER AN OPTICAL LINK FROM A SOURCE OF CONTROL-MODULATED LIGHT

CROSS-REFERENCE TO RELATED APPLICATION

This Application claims the benefit of U.S. Provisional Application Ser. No. 61/163,656 filed on Mar. 26, 2009, entitled DATA INTERFACE FOR A SPATIAL LIGHT MODULATOR, commonly assigned with the present invention and incorporated herein by reference.

TECHNICAL FIELD

This application is directed, in general, to an imaging system and, more specifically, to control of an array of light processing elements.

BACKGROUND

Optical devices that include an array of modulation elements or sensing elements are finding increasing application in various consumer, industrial and scientific applications. For example, a spatial light modulator (SLM) may form the basis of an image-projection system, or a CCD may be used as an image sensor in a camera. An SLM may include an array of modulation elements, where each element may be, for example, a tilting mirror, a diffractive ribbon, or a liquid crystal cell. In the field of image-projection systems, N elements may constitute a "picture element", commonly referred to as a "pixel", where N can be any non-zero rational number. Typically, a light source is used to illuminate the SLM array. The SLM array is configured to spatially modulate the light by manipulating the modulation elements. The spatially modulated light may then be projected, for example, onto a screen to form each pixel.

In some cases, a large throughput of data must be provided to the array to provide configuration data for each element of the array. When a light source provides multiple wavelengths to an SLM to support RGB projection, the data throughput is commensurately greater. Supporting this data throughput typically places significant demands on various system aspects related to the array, e.g., package input/output signal paths and design of a package housing the array.

SUMMARY

One aspect provides an optical device that includes an array of optical elements located over a package substrate. A controller is also located over the package substrate. The controller is operable to control an operational state of the array in response to an optical signal detected by an optical receiver.

Another aspect is a method of operating an optical device. The method includes providing an array of optical elements located over a substrate. The method further includes electrically coupling at least one optical receiver to a controller. The controller is operable to control an operational state of the array in response to an optical signal detected by the optical receiver. The optical receiver is illuminated with illumination light adapted to convey array state data. The operational state is changed in response to the control data.

Another aspect is a digital projection system that includes a spatial light modulator that in turn includes an array of modulation elements located over a package substrate. A projection light source is configured to illuminate the array with projection light. A control-modulated light source is configured to illuminate an optical receiver with light control-modulated with data associated with an array state. Optics are configured to project an image produced in response to modulation of the projection light by said array in said state. An array controller is located over the package substrate and is configured to control the state in response to the data detected by the optical receiver.

BRIEF DESCRIPTION

Figure 2:
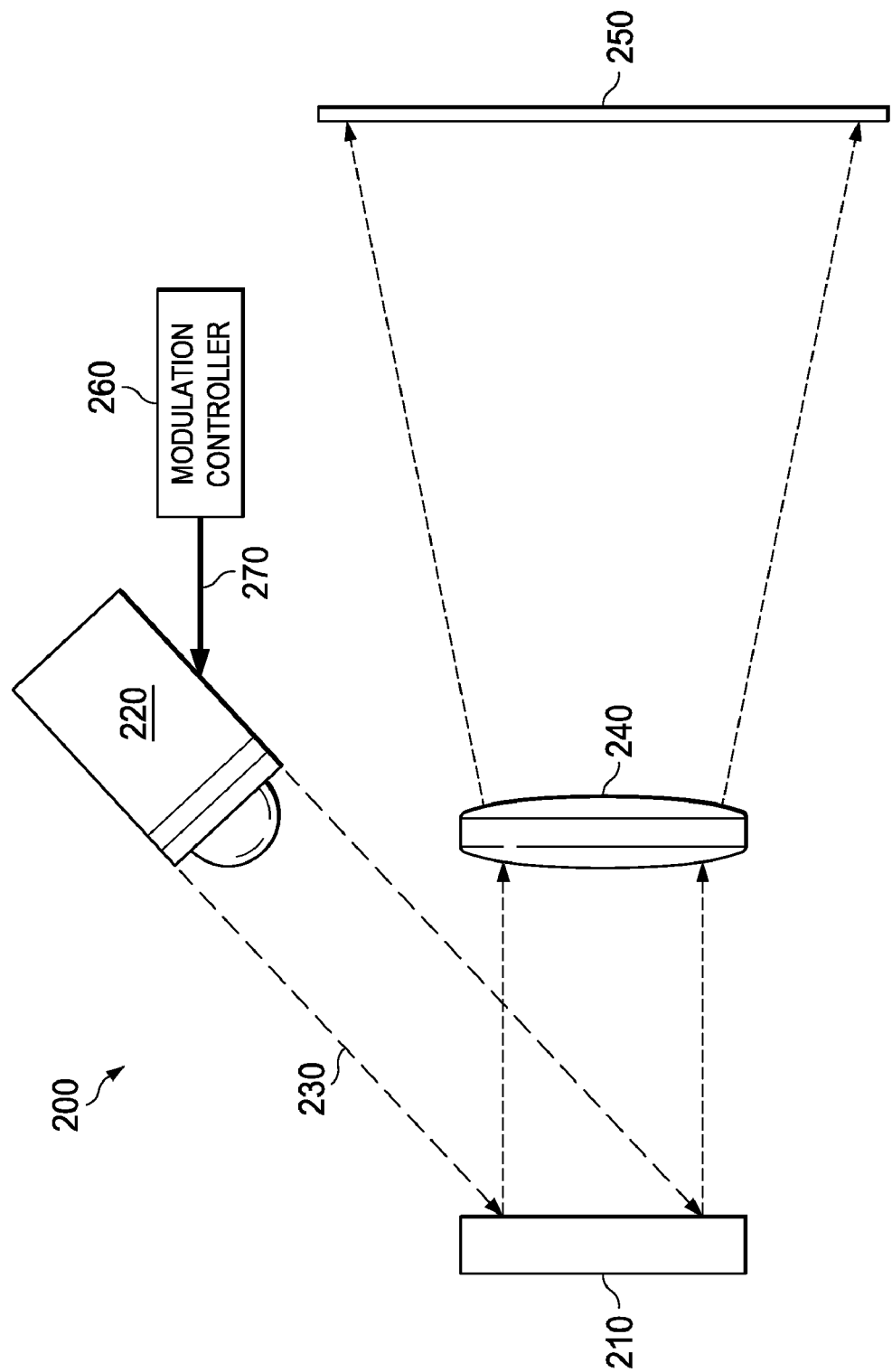
Figure 3A:
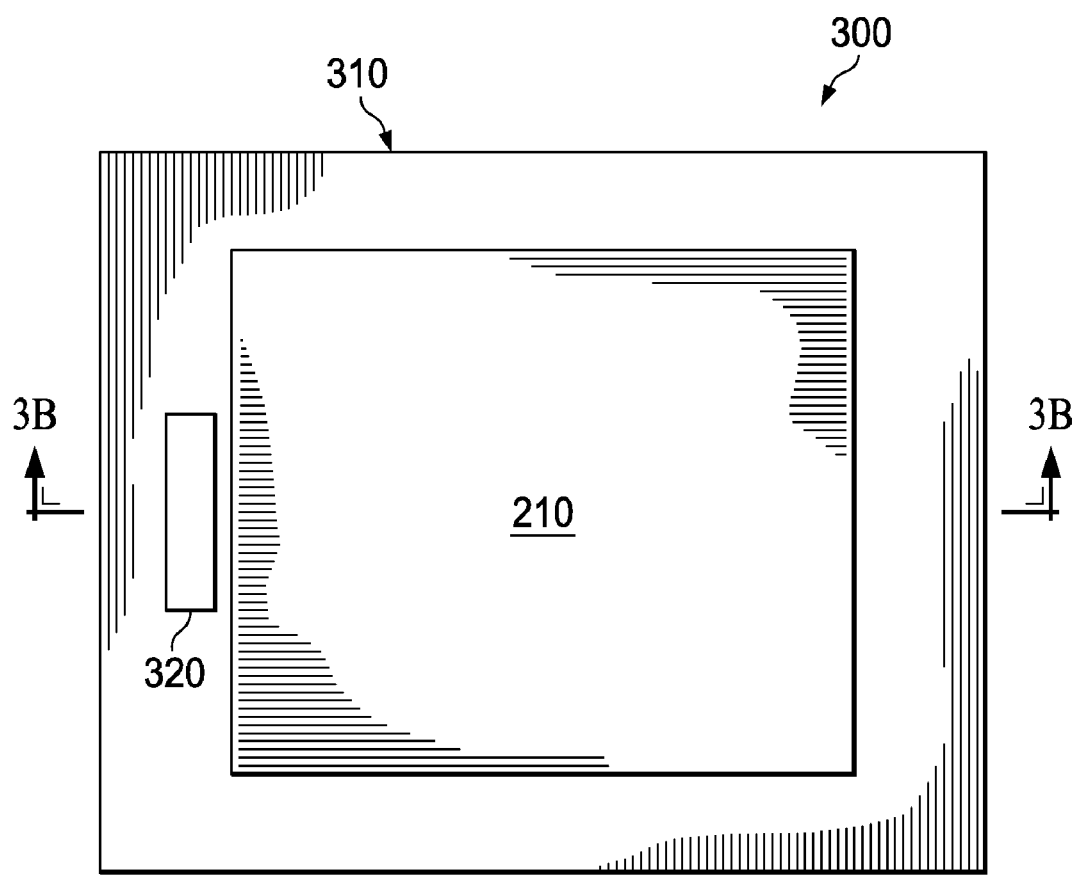
Figure 3B:
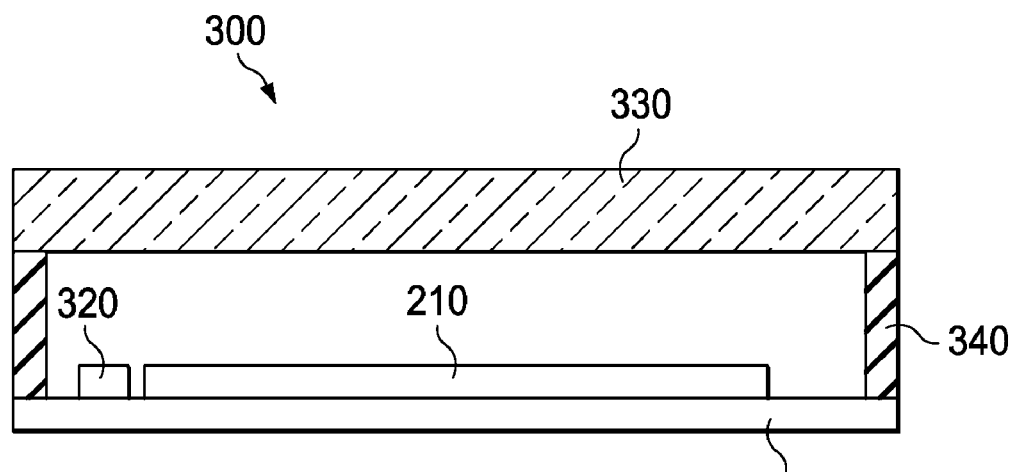
Figure 9:
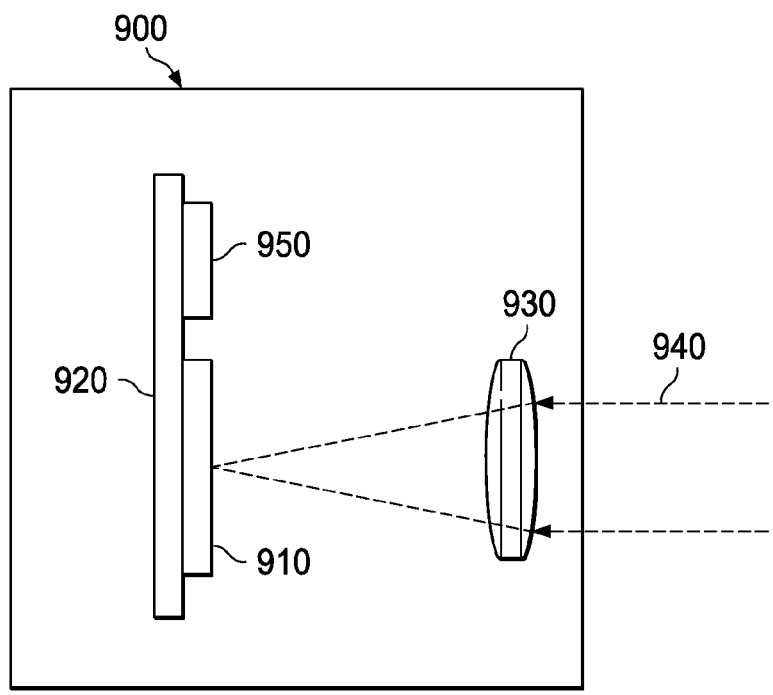
Figure 6A:
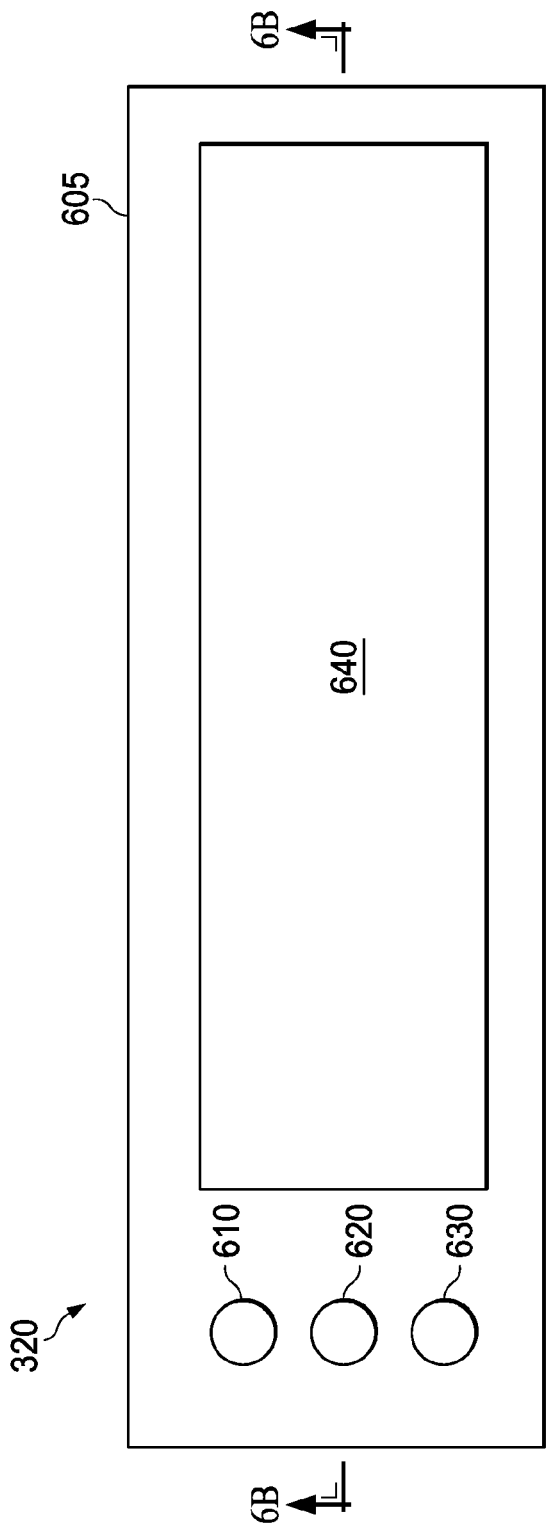
Figure 6B:
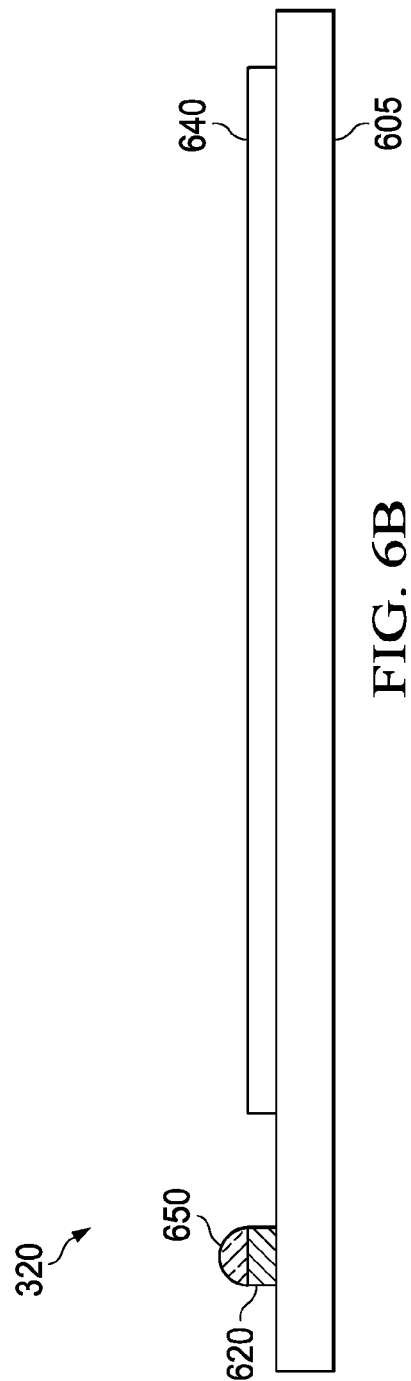
Figure 7:
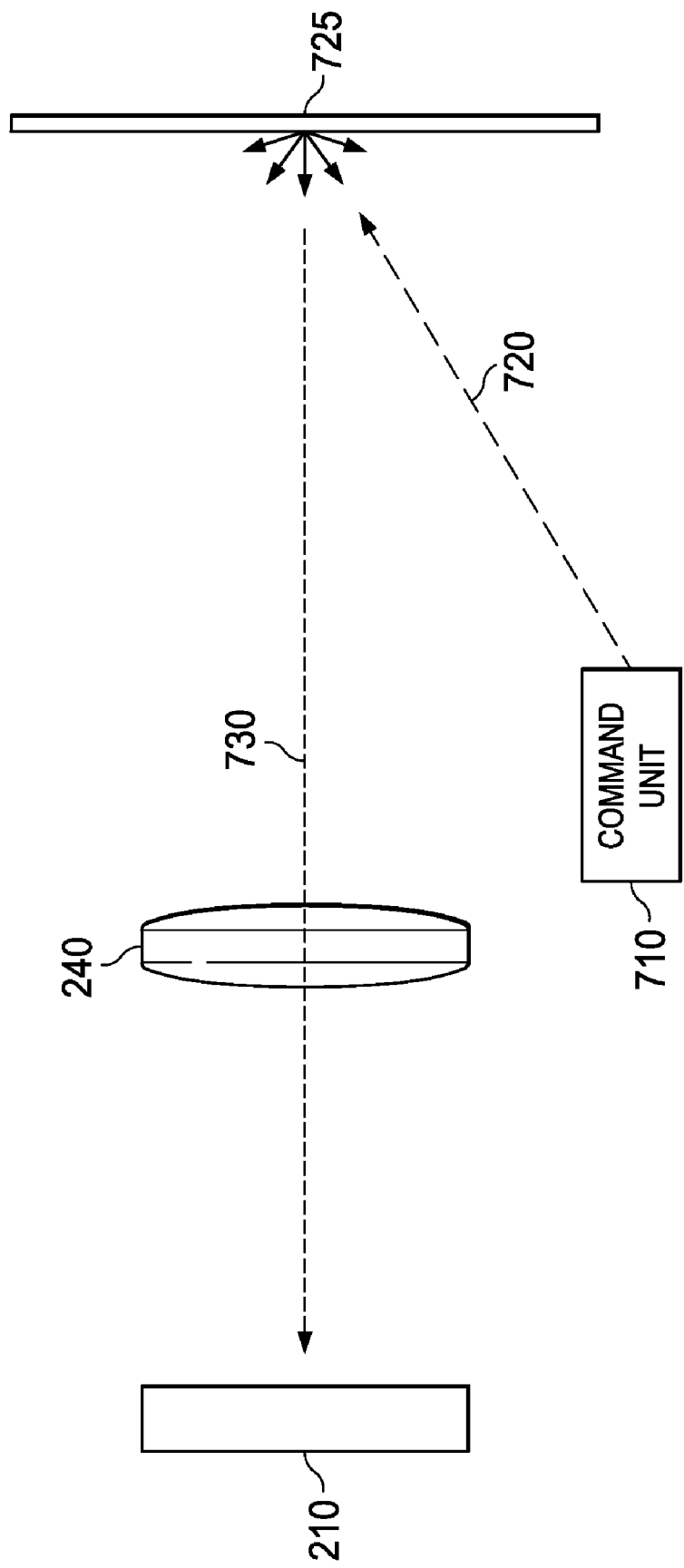
Figure 8A:
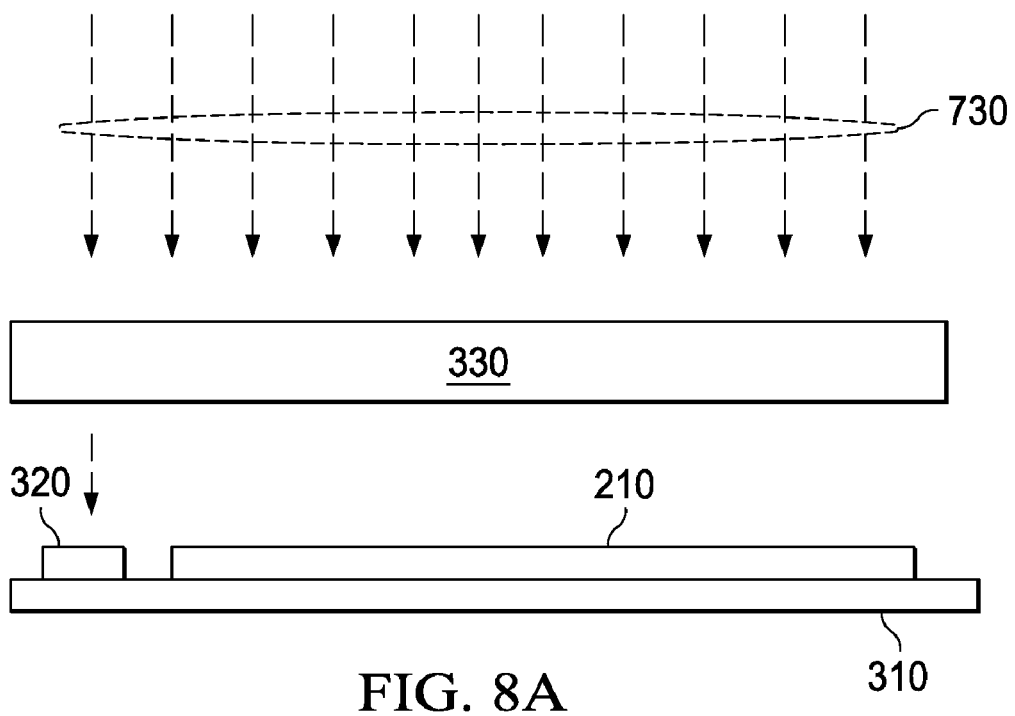
Figure 8B:
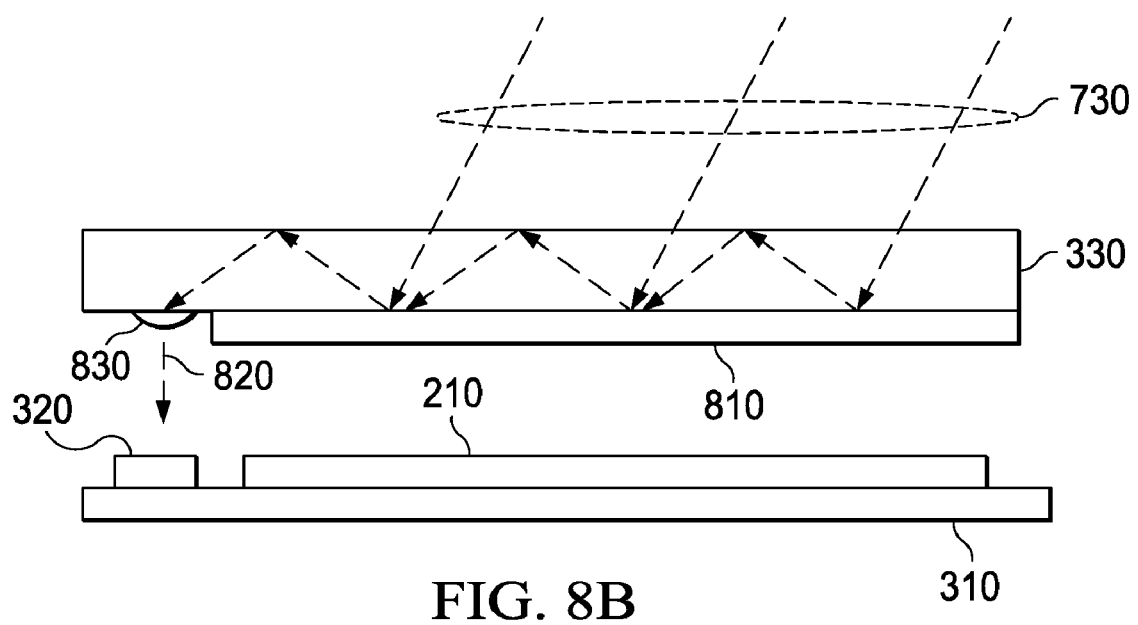
Figure 10:
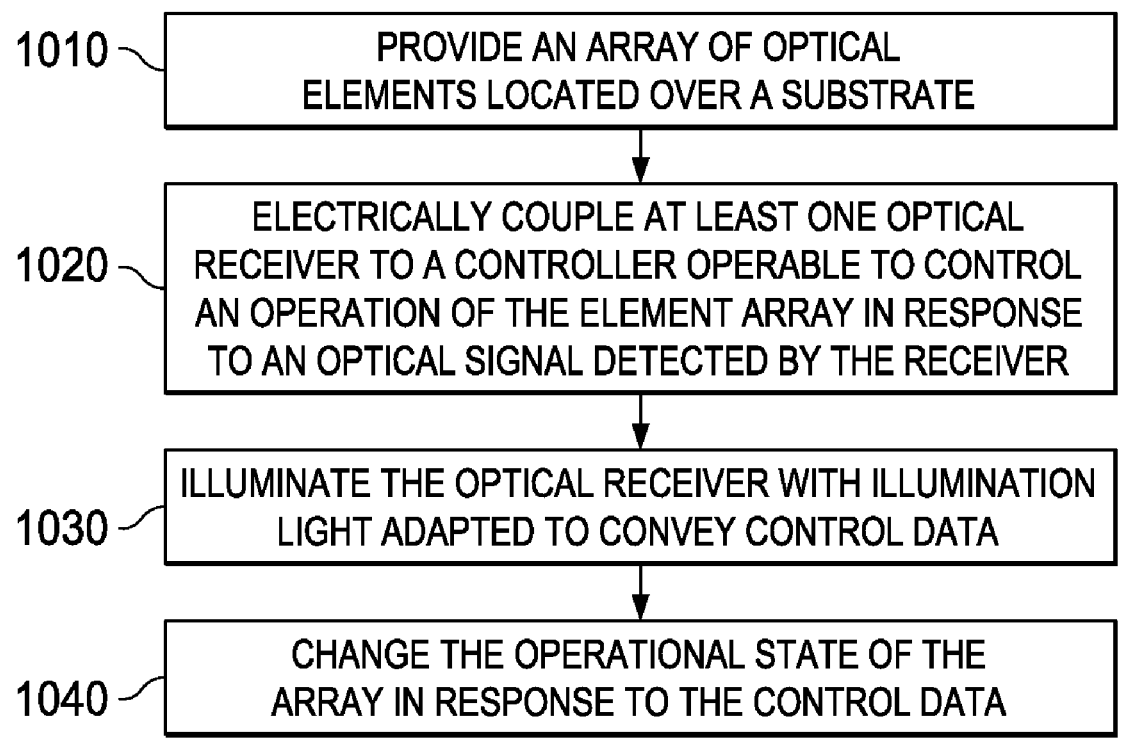

Reference is now made to the following descriptions taken in conjunction with the accompanying drawings, in which:
FIG. 1 is a prior art projection system;
FIG. 2 is a projection system of the disclosure;
FIGS. 3A and 3B illustrate a spatial light modulator in plan and sectional view, respectively;
FIGS. 4A-4C and 5A-5E illustrate modulation of a projection light source;
FIG. 6A and 6B illustrate an optical receiver;
FIGS. 7, 8A and 8B illustrate control of an array;
FIG. 9 illustrates an embodiment using a sensor array; and
FIG. 10 illustrates a method.

DETAILED DESCRIPTION

The inventors have recognized that aspects of system design using a pixilated optical device may be simplified by transmitting data to the device via an optical signal that illuminates the pixel elements. Among the benefits of such transmission is the reduction or elimination of wired data buses to the device. The device may be, e.g., a spatial light modulator (SLM), or an active pixel sensor such as a CCD or CMOS sensor. Various embodiments are presented using an SLM and an image projection system to exemplify the use of optical data transmission to the optical device. Such embodiments are presented without limitation to illustrate principles of the disclosure. It is explicitly recognized that the principles disclosed herein with respect to an image projection system may be employed with similar benefit to non-display applications of SLMs, such as, e.g., optical networking, spectroscopy, structured lighting, and maskless lithography. Moreover, it is explicitly recognized that the principles herein may be used with sensing applications, such as, but not limited to, digital cameras. Those skilled in the pertinent arts are capable of extending the principles disclosed herein to these and similar applications.

FIG. 1 illustrates a prior art imaging system 100. The system 100 includes a light source 110 and an array 120 of modulation elements shown as, e.g., a reflective SLM. During operation, projection light 125 provided by the light source 110 reflects from the array 120. The array 120 may include an array of mirrors that may be tilted to direct a light portion 130 through a lens 140. The projection light 125 may reflect from a mirror at a particular location to form a corresponding pixel of an image 150. A light portion 160 may be directed away from the lens 140, resulting in a dark spots at selected pixel locations of the image 150.

A controller 170 provides state data to the array 120. Some imaging systems provide red, green and blue (RGB) light sequentially to the array 120. Data received from the controller 170 is typically used to configure individual elements of the array 120 with state information designed to form the desired image. For example, red components of the image may be projected onto the image 150, followed by green components, followed by blue components. For example, a moving image projected with a frame rate of 16 frames per second, projection of red, green and blue subframes may require that a subframe of state data be transferred to the array 120 about once every 20 ms. Of course, higher and lower frame display rates will have different data transfer periods. Frames and subframes are described in greater detail below.

The state data is typically transmitted to the array 120 via a data bus 180 that may be, e.g., 16 bits wide. Each bit of the data bus 180 may use one input/output (I/O) pin of a package housing the array 120. The data pins have several drawbacks. First, each data pin represents a potential source of failure, either in the pin itself or in the path to or from the pin. Second, the cost of the package used to house the array 120 increases with pin count. Third, the pins consume package area that might otherwise be used to transfer heat from the array 120 to an underlying substrate for dissipation to the ambient environment.

FIG. 2 illustrates an imaging system 200 configured according to the disclosure. An array 210 of modulator elements is provided that may be, e.g., an SLM or similar optical device. Herein, "provided" means that a device, substrate, structural element, etc., may be manufactured by an individual or business entity performing the disclosed methods, or obtained thereby from a source other than the individual or entity. The array 210 includes modulation elements arranged in an ordered spatial arrangement, such as a rectilinear array, in a manner configurable to modulate a phase or intensity of illumination light directed onto the array. The array 210 may include, depending on the specific embodiment, a mirror array, reflective LCoS panels, or a transmissive LCD, a dynamic grating, e.g. The system 200 configuration is shown without limitation with the array 210 configured as a reflective mirror array. Those skilled in the pertinent art are knowledgeable of system configurations employed with other types of SLMs.

The array 210 has an array state associated therewith. The array state is a collective configuration of the elements that may be used to form an image, e.g. In a simple case, the array 210 includes elements that are mapped on a one-to-one basis with display pixels. Thus, the state may be, e.g., a pattern of mirror deflections that results in the desired image, where a deflected mirror illuminates a corresponding pixel, and an undeflected mirror turns that pixel off. In another case, a particular array element may map to more than one image pixel, such as, e.g., a linear (1-D) modulator array or spatial dithering. In some cases, multiple array elements may map to a single pixel, e.g., to provide redundancy.

An illuminator 220 is configured to provide illumination light 230 to the array 210. Modulated light reflected therefrom may be transmitted through a lens 240 and displayed as a projected image 250 as for a conventional system.

As used herein, illumination light is electromagnetic radiation from all sources that are directed to the array 210. Illumination light may include wavelengths that are visible and non-visible to the human eye. In various embodiments described herein, the illumination light 230 includes two functional components, projection light and control-modulated light. Projection light is generally configured to produce the image 250. As described more fully below, projection light may include multiple wavelengths of light interleaved (time multiplexed) to produce a sequence of frames of the image that is perceived by a viewer as being a full-color image.

In embodiments described below, control-modulated light is one or more wavelengths of light used to convey data or control information to the array 210. The control-modulated light may be visible or non-visible, and may have a wavelength selected to be effectively imperceptible to a viewer when the image 250 is formed. In some cases, the control-modulated light has a wavelength distribution that partially or wholly overlaps the projection light spectral distribution. In other cases, the spectral distribution of the control-modulated light does not significantly overlap the projection light distribution. As an example, the control-modulated light may be in the infrared portion of the spectrum, while the projection light is in the visible portion of the spectrum. In other embodiments, control signals are conveyed via the control-modulated light at a same wavelength as the projection light. In such cases, the control-modulated light may be considered the light required to result in a modulated intensity of the illumination light configured to convey data to the array 210. It is expected that such modulation will be configured to be effectively imperceptible to a viewer.

Control-modulated light includes embodiments in which a light source is directly modulated with control data, and embodiments in which at least two light sources are combined, at least one of which being control-modulated. Thus, in various embodiments, the illuminator 220 includes a source of projection light that is mixed with control-modulated light from another source modulated to carry control data, thereby providing the data to the array 210. Control-modulation may include, e.g., modulating intensity or phase. In other embodiments, data are provided to the array 210 by a light source independent of the projection light source. In this context, independent means that the light is incident onto the array 210 via a path that is at least partially distinct from a path taken by the illumination light 230. See, e.g., FIG. 7 and associated discussion below.

In contrast to the conventional system 100, a modulation controller 260 is configured to provide control data to the illuminator 220. Control data may include, e.g., array state data or command and control instructions. The control data may be, e.g., configured to change an operational state of the array 210 by changing an array state thereof. As used herein, the phrase "configured to" means that the element, device, system or subsystem includes the necessary software, hardware, firmware or a combination thereof to accomplish the stated function. A data bus 270 may transmit data from the controller 260 to the illuminator 220. But no wired data bus between the array 210 and the controller 260 is needed to transmit array state or control data therebetween, as the illumination light is modulated to convey this data.

FIG. 3A illustrates a plan view of an optical device over a substrate 310, with the array 210 and a controller thereover. In some embodiments, the substrate 310 is a semiconductor substrate. In a nonlimiting example, the array 210 and the controller 320 are both fabricated on a semiconductor die that acts as an electrical and mechanical substrate. In some embodiments, the substrate 310 is a package substrate. A package substrate is a substrate that supports components associated with a device package, e.g., the array 210, the controller 320, and a package cover. In some cases, the array 210 and the controller 320 are fabricated on a semiconductor die that is then located on the substrate 310. The substrate 310 may include, e.g., dielectric layers and metal traces to route signals from package I/O terminals to the array 210 and the controller 320. In some cases, the substrate 310 constitutes a multichip module (MCM) substrate. In such cases, the array 210 and the controller 320 may be formed on different semiconductor die, with both die being located on the substrate 310. The substrate 310 may be formed from, e.g., a semiconducting, ceramic or plastic material.

The array 210 includes a plurality of spatial light modulator elements that may be used to control the pixels of the image 250. The array 210 may include, e.g., micromirrors, diffractive ribbons, or liquid crystal domains. The modulation may include, e.g., redirection of light, manipulation of the light phase, or variable modulation of the light intensity such as by changing the opacity of a spatial light filter.

The controller 320 is configured to recover the control data from an electrical signal derived from the control-modulated light. As discussed in detail below, the controller 320 may be coupled to components such as, e.g., photodiodes to detect the control-modulated light or another optical control signal. The control data are recovered from the incident light and used to control the operation of the array 210 in response thereto. An operation may be a function to manipulate a projected image, such as, e.g., a pixel pattern, control commands such as an on or off command, image brightness, or other projected image manipulation function.

FIG. 3B illustrates a sectional view of the device 300. In addition to the array 210 and the controller 320, a window 330 may be located over the substrate 310. Spacers 340 are located between the substrate 310 and the window 330. As discussed below, in some embodiments the window 330 acts as a functional optical component.

Figure 4A:
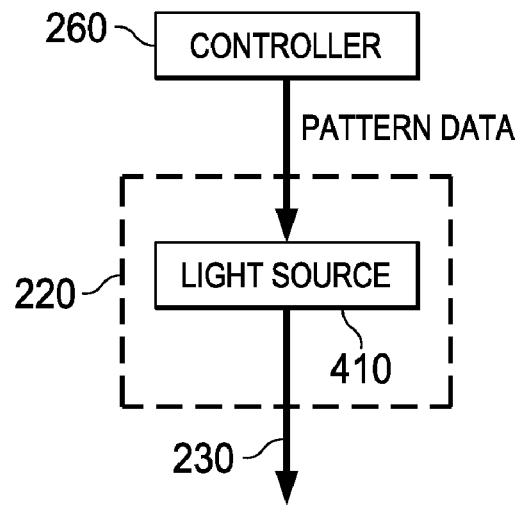

Modulation of the illuminator 220 may be done in several ways. FIG. 4A illustrates one embodiment in which the illuminator 220 includes a light source 410. The controller 260 directly control-modulates the source 410 to provide a variable intensity, a variable phase, or a variable polarity of light.

The illuminator 220 may be modulated at a frame rate and/or a subframe rate. Viewed generally in terms of information transfer, a frame rate is a rate at which the array of the array 210 may be illuminated with one class of data that updates at a lower rate. A period corresponding to the frame rate is termed a data update frame. In a nonlimiting example, an update frame is a frame period of a motion picture, e.g., about 30-60 ms. The information conveyed during the update frame period may be, e.g., a single frame image.

A subframe rate is a rate at which the array is illuminated with another class of data that updates at a greater rate. A period corresponding to the subframe period is a data update subframe. An update subframe may be a division of the update frame, used to convey data during the update period. A different color of illumination light may be used in different update subframes, e.g. If each update frame is divided into three update subframes, e.g. for red, green and blue subframe projection, the update subframe period may be about 10-20 ms.

While various embodiments herein are described in terms of image projection (e.g. a movie), the scope of the disclosure includes other embodiments in which data transfer by modulation of illumination light may be organized by data update frame and data update subframe. One example is manipulation of coherent radiation, e.g., visible or UV light, in surgical or manufacturing applications, e.g., LASIK.

In some embodiments, as discussed in detail below, the intensity of the source 410 is control-modulated in a preceding subframe with a data stream encoding an array state of a subsequent subframe. Methods of such modulation are known to those skilled in the pertinent art. In some embodiments, the source 410 is a broad spectrum source, such as an incandescent bulb or broadband LED. In other embodiments, the source 410 is a source of colored light, e.g., a spectrum perceived by a viewer as a color such as red, green or blue. In some cases, the illuminator 220 may include a plurality of sources 410, e.g. each having a different spectral output.

Figure 5A:
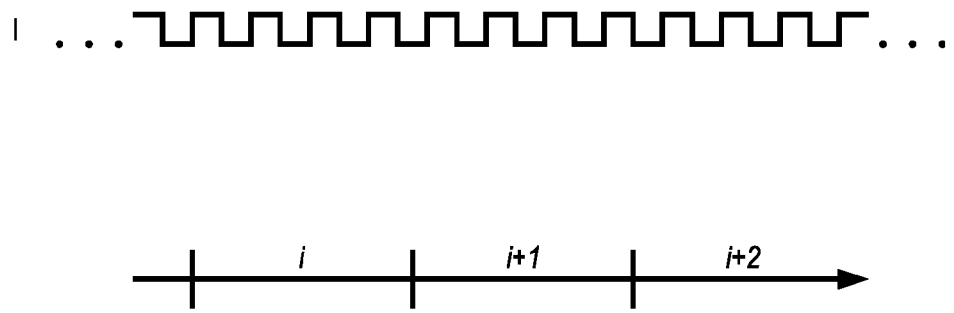

FIG. 5A illustrates an embodiment in which a single source 410 is used, such as shown in FIG. 4A. Such may be the case, e.g., wherein only a monochromatic image 250 is desired. The source 410 has an average intensity I. The controller 260 may modulate the intensity about the average intensity. The modulation scheme may be any suitable scheme. In some embodiments, the modulation scheme includes error correction bits, e.g., redundant bits to support forward error correction. I some embodiments, the modulation magnitude and/or rate are configured such that the modulation is not apparent to a viewer.

Figure 5B:
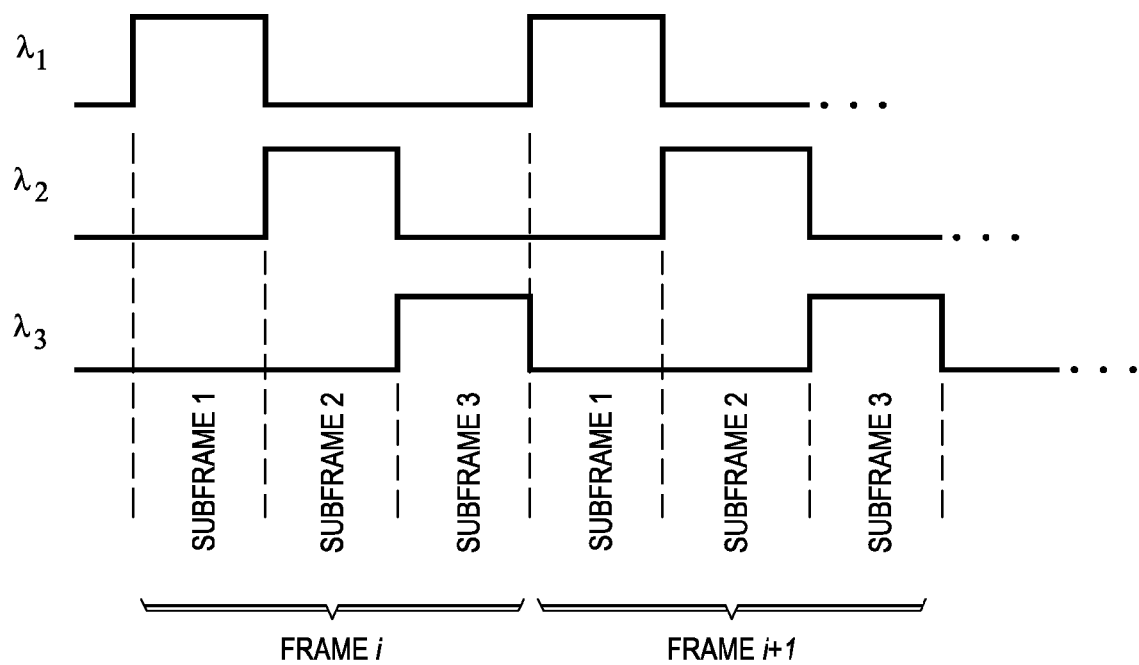

FIG. 5B illustrates an embodiment in which a data update frame is divided into three update subframes. Such a configuration may be used, e.g., for projecting a color image. Each frame may be projected as a number of subframes, represented without limitation as subframes 1, 2, and 3. Each subframe may be projected with a different color, such as, e.g., red, green and blue. Those skilled in the pertinent art understand that other color schemes may be used as well. Therefore, colors are hereinafter referred to generally as $\lambda_1$, $\lambda_2$, and $\lambda_3$, e.g. However, colors are not necessarily monochromatic. For example, light having a particular color may have a peak intensity at a wavelength $\lambda_1$, with a distribution around $\lambda_1$ characterized by a full-width-half-maximum (FWHM) value that is small enough that the light is perceived as, e.g., a primary color such as red, green or blue. The subframes are typically integrated by a viewer's eye to form a perceived image with a desired color mix determined in part by the patterns of the projected $\lambda_1$, $\lambda_2$, and $\lambda_3$ light. When a broad spectrum source is used, a spectral chopper, such as a color wheel, may be used to provide the succession of colored light sub-frames. In other embodiments, each of a plurality of sources 410 may be configured to produce a different color.

In the embodiment illustrated by FIG. 5B, array state data of the array 210 of a subsequent subframe may be encoded on the illumination light of a preceding subframe. Thus, for example, the illumination light of frame i, subframe 1 may be modulated with the data to encode an array state for frame i+1, subframe 2. The array state of a particular frame need not be encoded on an immediately preceding frame. For example, frame i, subframe 1 may be modulated with array state data associated with frame i+1, subframe 1.

Figure 5C:
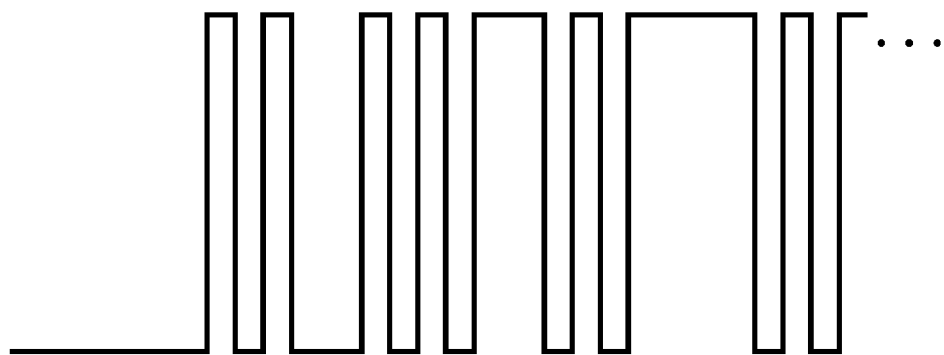

The modulation of the illumination light may be binary. In some embodiments, the source 410 is control-modulated in on-off fashion, as illustrated in FIG. 5C. In this case, the modulation may be at a frequency high enough that the viewer's eye will integrate the projected light to perceive an average brightness. The modulation may be any suitable format, e.g., RZ or NRZ or other conventional method. In some cases, an NRZ format may be preferred to result in a more consistent average brightness of the displayed image. In some embodiments, the source 410 is control-modulated with less than the full amplitude thereof.

In the nonlimiting example illustrated in FIG. 5A, e.g., the brightness of the source 410 may be control-modulated with, about 10% of the maximum brightness. The magnitude of the modulation may be sufficient to provide an adequate signal to noise (S/N) ratio at an optical sensor configured to recover the data. In embodiments using an incandescent light source, which cannot generally be rapidly switched, control-modulated light may be provided by LED or laser light co-propagating with the incandescent light. The control-modulated light may be combined with the incandescent light by, e.g., prisms or dichroic filters. In some embodiments, the illumination light is control-modulated with more than two states, e.g., ternary modulation, so that more information may be transmitted in a unit of time.

Figure 4B:
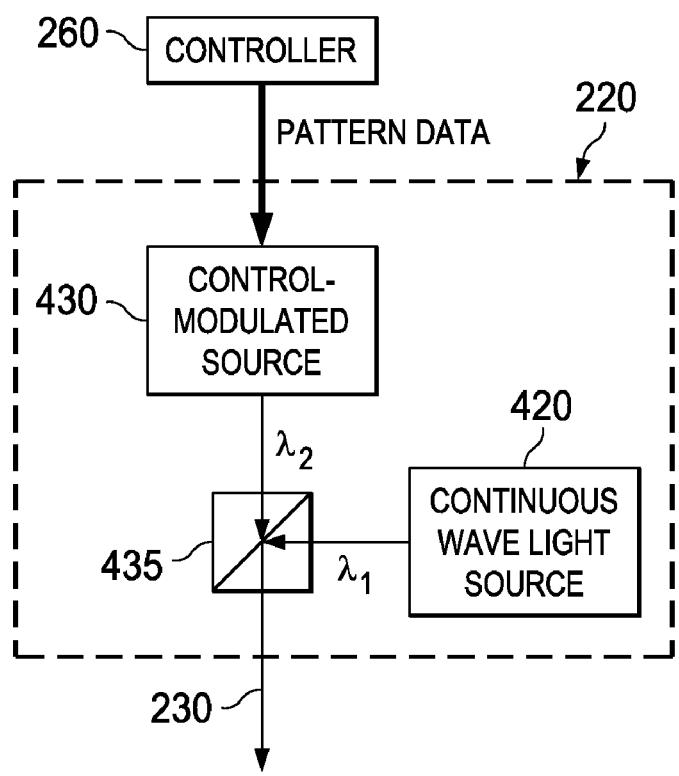

Turning to FIG. 4B, an embodiment is illustrated in which a continuous wave (CW) light source 420 having a peak wavelength $\lambda_1$ is combined with a control-modulated light source 430 having a peak wavelength $\lambda_2$. The sources 420, 430 may be broadband or narrowband, and may have a same or a different peak frequency as determined by the particular application.

As used herein, narrowband light refers to light from an individual light source that emits a spectrum which is narrower than the overall spectrum used to illuminate an SLM, e.g. the array 210. A narrowband light source may have a spectral distribution that does not significantly overlap a spectral distribution of another narrowband light source used to illuminate the array 210. For example, if the emission band of a narrowband light source is taken to be the frequencies between the FWHM limits of the source, then the emission bands of each respective narrowband source do not overlap when the FWHM ranges do not overlap. In some cases, the FWHM range of a narrowband light source will fall entirely within a single color range of the visible spectrum, e.g., red, green or blue. Nonlimiting examples of narrowband light sources include lasers, and some LEDs. A broadband source is one that produces light that spans several colors of the visible or non-visible spectrum. In some cases, a broadband source is perceived as white to a viewer.

The light source 430 may output light directly at a desired wavelength or may be filtered to produce the desired wavelength. The modulating is in response to control data produced by the controller 260. The sources 420, 430 are combined by a combiner 435 that may be, e.g. a prism or a dichroic filter. Use of different wavelengths for $\lambda_1$ and $\lambda_2$ may be desirable in some cases to increase S/N ratio when recovering the data from the illumination light 230, e.g. When $\lambda_1$ and $\lambda_2$ are not equal, $\lambda_2$ may be selected to be a color not easily perceived by a viewer. For example, a $\lambda_2$ may be used that is visible but not easily distinguished from $\lambda_1$ by the human eye, though is distinguishable by an electronic receiver. In other cases, $\lambda_2$ may be selected to be a wavelength determined to have an insignificant effect on the perception of an image formed by the array 210, though of a significantly different wavelength from $\lambda_1$ to enhance data recovery. The wavelength and intensity of the control-modulated source 430 may be selected to meet system S/N and audience perception objectives.

In some embodiments, the total data rate to the array 210 may be several gigabits per second, depending on the frame rate, the size of the SLM array, the number of pixels to be reproduced, and the pixel bit-depth. In some cases, the total data rate may exceed the rate at which data may be transmitted by a single channel, either because of limitations on the light source modulation or on the receiver response. In such cases, the transmitted data may be split, e.g., multiplexed, between two or more channels.

Figure 4C:
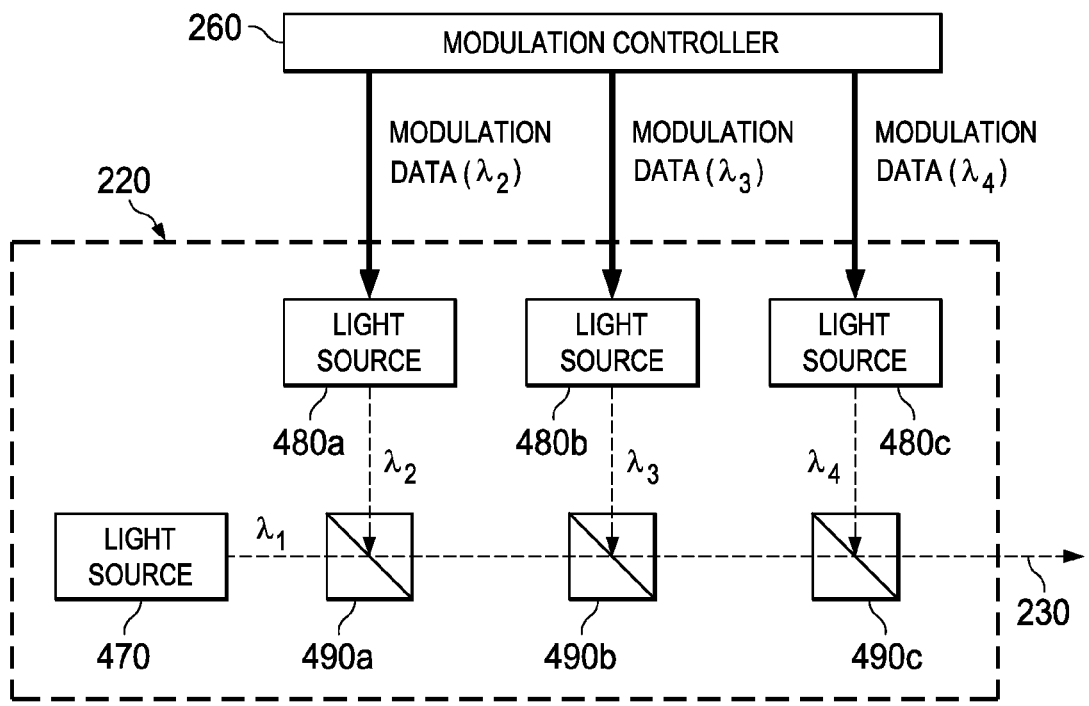

FIG. 4C illustrates an embodiment in which projection light having wavelength $\lambda_1$ is combined with one or more different wavelengths of control-modulated light. In the illustrated non-limiting embodiment, a light source 470 is configured to output projection light with a wavelength $\lambda_1$. The wavelength $\lambda_1$ is combined with one or more wavelengths, e.g., $\lambda_2$, $\lambda_3$, and $\lambda_4$ output by light sources 480a, 480b and 480c, respectively.

Figure 5D:
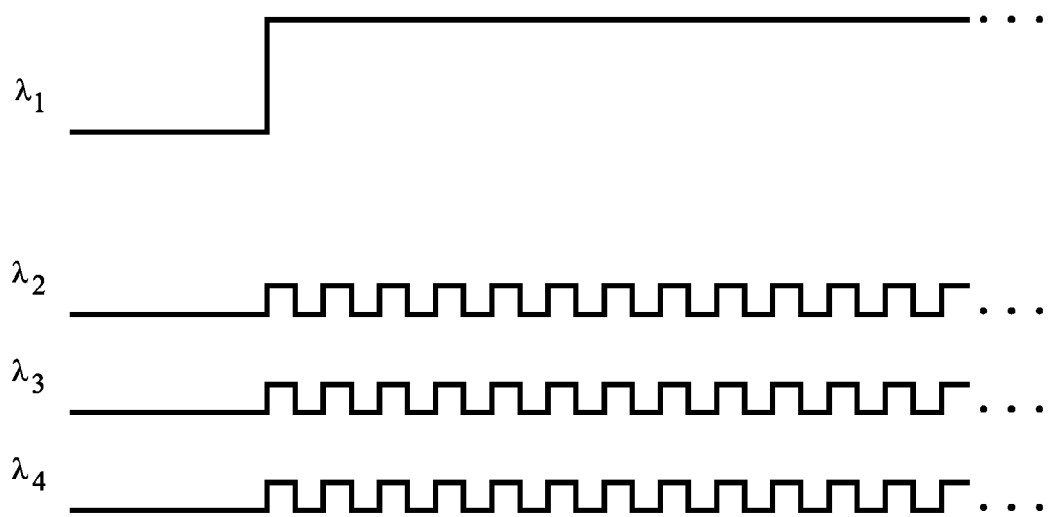

FIG. 5D illustrates aspects of this embodiment. Illumination light at $\lambda_1$ is modulated with three wavelengths $\lambda_2$, $\lambda_3$, and $\lambda_4$ configured to transmit state data for a later update frame or subframe. The source 470 may be, e.g., a source of red light that illuminates a subframe of an image for an update subframe. The sources 480a, 480b and 480c provided data multiplexed over multiple frequencies to meet a data rate needed to convey the subframe data within an update subframe.

Figure 5E:
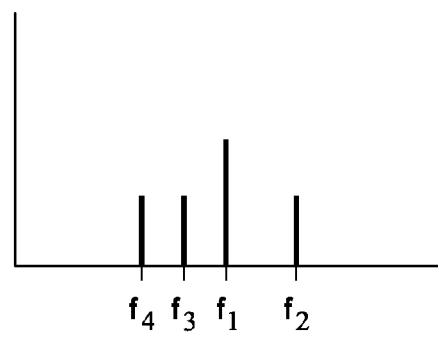

The combined illumination of the array 210 may be represented as in FIG. 5E by a spectral distribution that includes a primary spectral peak at $f_1$ and secondary spectral peaks at $f_2$, $f_3$, and $f_4$. The combining may be produced by combiners 490a, 490b, 490c (FIG. 4C), respectively, which may be, e.g., prisms or dichroic color filters. The selection of $\lambda_2$, $\lambda_3$, and $\lambda_4$ may be determined by factors including the effect on the color balance of a projected image and commercially available light sources, e.g. In some embodiments, $\lambda_2$, $\lambda_3$, and $\lambda_4$ are similar to $\lambda_1$, e.g., perceived by the human eye to be the same or nearly the same color. In other embodiments, one or more of $\lambda_2$, $\lambda_3$, and $\lambda_4$ may be perceived as a different color from $\lambda_1$, but may have a low enough intensity to insignificantly affect the perceived quality of a projected image. In still other embodiments, one or more of $\lambda_2$, $\lambda_3$, and $\lambda_4$ may be non-visible. The sources 480a, 480b and 480c may be narrowband or broadband sources, and may produce the desired wavelength directly or by filtering. A coherent source may be, e.g., a laser source. A non-coherent source may be, e.g., an LED or incandescent lamp.

The use of multiple wavelengths to transmit control data may be advantageous in those embodiments in which it is desirable to limit the data rate of any one optical channel. For example, in some cases the data throughput needed to transfer an image pattern during a subframe period may exceed the maximum transfer rate of associated LEDs and photo diodes. In this case, the data may be transmitted in two or more parallel optical paths represented by the multiple wavelengths. In some embodiments, the data is multiplexed between two or more wavelengths of projection light. For example, if the data flow required to configure the array 210 is 3 GBPS (gigabits per second), a serialized bit stream may be divided into three 1 GPBS bit streams communicated on $\lambda_2$, $\lambda_3$, and $\lambda_4$. In some embodiments the control data are evenly distributed among available control-modulated light sources, though the disclosure is not limited to this configuration.

FIG. 6A illustrates an embodiment of the controller 320, and includes a substrate 605 supporting optical receivers 610, 620, 630 and an array controller 640. In some embodiments the array 210 and the controller 640 share a same substrate, e.g., such as when formed on a single silicon die. In other embodiments, the substrate 310 and the substrate 605 are noncontiguous substrates, each mounted on another substrate such as a device package.

In some embodiments, the receivers 610, 620, 630 and the controller 640 are located over the substrate 605, as illustrated. In other embodiments, the receivers 610, 620, 630 are located on a different substrate than the controller 640. For example, the receivers 610, 620, 630 may be located in a different package than the controller 640 and the array 210, with both packages mounted to a printed circuit board. In this case, the receivers 610, 620, 630 may be coupled to the controller 640, e.g., through I/O terminals on the package housing.

The receivers 610, 620, 630 may be any conventional or later discovered device configurable to convert received light energy to an electrical signal. In a nonlimiting example, photodiodes such as PIN diodes may be used. The controller 640 is configurable to receive electrical signals from the receivers 610, 620, 630, to demodulate the electrical signals to recover array control data therefrom, and to condition the data for transmission to the array 210. In some embodiments, the controller 640 also recovers a data clock from the received light. In some embodiments, the receivers 610, 620, 630 are formed in the substrate, while in other embodiments they may be provided as discrete components, e.g., surface mount devices.

The controller 320 is illustrated having three receivers 610, 620, 630, but the disclosure is not so limited. In various embodiments, there is one optical receiver for each color used to transmit array state data to the array 210. In some cases, array state data may be transmitted with light having a spectrum that includes light from more than one color of the visible spectrum. In such cases, each receiver 610, 620, 630 may be configured to respond to one or more colors within the transmitted light. The several receivers, e.g., the receiver 610, 620, 630, may be configured to have a spectral response that results in sufficient discrimination by each receiver 610, 620, 630 such that detection errors are limited to an acceptable level.

In a non-limiting example, three light sources with three different wavelengths transmit array state data during each of three subframe periods corresponding to, e.g., RGB, illumination. In this embodiment, the controller 320 may have nine optical receivers, e.g., one for each data channel. In some other embodiments, the data rate is slow enough that a single data channel is needed. In this case, the data may be accommodated by a single optical receiver.

In some embodiments, one or more of the receivers 610, 620, 630 includes a filter to allow a preselected range of frequencies to be detected. A filter may be a separate component, e.g., a filter plate, or may be integrated with an optical receiver. In one embodiment, the filter is a stack of dielectric layers the index of refraction and thickness of which are selected to transmit a desired frequency band. Those skilled in the pertinent art have the requisite skill to implement such a filter.

In some embodiments, the controller 320 includes redundant receivers. In one embodiment, at least one set of receivers that duplicate the receivers 610, 620, 630 is located over the substrate 310. In one embodiment, the one or more redundant receivers are used to provide greater noise margin in detecting data provided via control-modulated light. In another embodiment, one or more redundant receivers are configured to provide error detection or correction capability to the controller 320. Specific implementation of error detection and correction are well known in the art.

FIG. 6B illustrates a sectional view of the controller 320. In addition to the components previously described, an optional lens 650 may be located over the receiver 620. The lens 650 may be configured to gather light to increase sensitivity of the receiver 620. In other embodiments, the lens 650 includes a prismatic element to direct light to the receiver 620. Any or all of the optical receivers may be configured with a lens, prism or other optical element configured to aid the collection of light. In some cases, different optical receivers are configured with different lenses or prisms as appropriate for wavelength or location on the controller 320, e.g.

Turning to FIG. 7, illustrated is an embodiment in which a command unit 710 provides control-modulated light modulated with command data to the array 210 via an optical signal 720. The command data may include array state data or control commands. Such control commands may be used, e.g., to control an operational state of the array 210 such as on-off, brightness, and pausing an image display. The unit 710 may be operated by a user separated by several meters from the array 210. The unit 710 may further be a mobile source of control-modulated light, such as, e.g., a handheld infrared transmitter. In some cases, a control command may be transmitted via the signal 720 to the controller 320 directly through the lens 240. In other cases, as illustrated, the signal 720 may be transmitted indirectly to the controller 320 via a reflecting surface within a line of sight of the array 210 through the lens 240.

In the illustrated embodiment, the signal 720 scatters off a screen 725. A portion 730 of the scattered light is incident upon the array 210 by indirect illumination. Because the signal 720 may be scattered, the unit 710 may be outside a line of sight of the array 210. The signal 720 may be visible or non-visible light. The wavelength may be selected to provide a desired sensitivity of the array 210 to the signal 720 given the spectral distribution of the illumination light 230 (see FIG. 2) and the optical characteristics of the display venue.

FIG. 8A illustrates one embodiment in which the portion 730 is directly received by the controller 320. The controller 320 is essentially illuminated only by that light from the portion 730 passing through the window 330 above the controller 320. While the illustrated embodiment is relatively simple, in some cases the received light will be insufficient for reliable control.

In FIG. 8B, light from the portion 730 is captured by the window 330 and travels by total internal reflection (TIR) to a position over the controller 320. In this manner, the window 330 may selectively redirect the specific control-modulated light wavelengths of the portion 730 away from the array 210 toward the controller 320. Capturing of the light may be aided by use of a layer 810 formed on the window 330. The layer 810 is configured to allow light to pass from the array 210 through the window 330. However, the layer 810 causes some light from the portion 730 arriving at an acute angle to the window surface to be refracted at an angle that allows propagation between the window surfaces by TIR. Because multiple rays of the diffracted light may be directed to a location of the window over the controller 320, the embodiment of FIG. 8B may have the effect of increasing the brightness of a light signal 820 that reaches the controller 320. The layer 810 may be formed of a volume Bragg grating or a holographic film, e.g. In some embodiments, a lens 830 is positioned over the controller 320. The lens 830 may, e.g., cause light propagating between the surfaces of the window 330 to be emitted preferentially at the lens 830, further enhancing the signal provided to the controller 320.

FIG. 9 illustrates another embodiment of the disclosure. A camera 900 includes an active pixel sensor 910 located over a substrate 920. The sensor 910 includes an array of sensing elements, e.g., CCD or CMOS light-sensing devices. A lens 930 focuses illumination light 940 onto the sensor 910. The sensor 910 may convert the light 940 to electrical signals to be processed to form an image, e.g. The light 940 includes an optical control signal configured to control the sensor 910. The signal may be, e.g., one or more wavelengths of light modulated to convey control information to the camera 900. A controller 950 receives the electrical signals from the sensor 910, and derives the control information therefrom.

The control signal may be, e.g., a visible or invisible (e.g., IR) wavelength of light with a wavelength and/or intensity determined to have an insignificant effect on quality of an image formed from the light 940. The light may include multiple wavelengths modulated independently, e.g., red, green and blue. The signal may be, e.g., pulse-code modulated with the control information. Information may include, e.g., a command to change an operational state of the sensor 910, e.g., acquire an image, focus the light 940, change a magnification factor of the light 940, or change contrast or color balance of an acquired image.

FIG. 10 illustrates a method of the disclosure. The method begins with a step 1010. In the step 1010, an array of optical elements is provided located over a substrate. In a step 1020, at least one optical receiver is electrically coupled to a controller operable to control an operation of the element array in response to an optical signal detected by the receiver. In a step 1030, the optical receiver is illuminated with illumination light adapted to convey control data. The illumination light may be the illumination light 230 or the light 940, e.g. The illumination light may be modulated to provide the optical signal as previously described. In a step 1040, the operational state of the array is changed in response to the control data.

Those skilled in the art to which this application relates will appreciate that other and further additions, deletions, substitutions and modifications may be made to the described embodiments.

What is claimed is:

1. An imaging device, comprising:
   a spatial light modulator having an array of light modulating elements; and
   a controller configured to set states of individual ones of the light modulating elements in response to image pixel state configuration data received wirelessly over an optical link from a source of control-modulated light, in order to spatially modulate projection light directed onto the array from a source of projection light for projection of an image.

2. The device of claim 1, wherein the light modulating elements are tiltable mirrors; and the controller is configured to set tilt states of the mirrors.

3. The device of claim 2, wherein the controller is configured to set the states in response to image pixel state configuration data received over the optical link from a source of control-modulated non-visible light.

4. The device of claim 3, wherein the source of control-modulated light is a source of control-modulated infrared light.

5. The device of claim 4, wherein the controller is further configured to recover control signals also conveyed over the optical link from the source of control-modulated light.

6. The device of claim 5, further comprising photodiodes cooperative with the controller for detecting the control-modulated light.

7. The device of claim 6, wherein the device is enclosed in a package having a window; the array elements are located for receipt and reflection of the projection light through the window; and the photodiodes are located for receipt of the control-modulated light through the window.

8. The device of claim 7, wherein the array and photodiodes are formed on a common substrate with the photodiodes located peripherally of the array.

9. An imaging system, comprising:
   a source of projection light;
   a source of control light;
   a spatial light modulator having an array of light modulating elements;
   a first controller for modulating the control light; and
   a second controller configured to set states of individual ones of the light modulating elements in response image pixel state configuration data received wirelessly over an optical link from the source of control light modulated by the first controller, in order to spatially modulate projection light directed onto the array from the source of projection light for projection of an image.

10. The system of claim 9, further comprising optical elements for directing at least a portion of the projection light toward the array and a portion of the modulated control light toward the second controller over a common optical path.

11. The system of claim 10, wherein the light modulating elements are tiltable mirrors; and the second controller is configured to set tilt states of the mirrors.

12. The system of claim 11, wherein the source of control light is a source of non-visible light.

13. The system of claim 12, wherein the second controller is further configured to recover control signals from control signal data also received also received wirelessly over the optical link from the source of control light modulated by the first controller.

14. The system of claim 13, further comprising photodiodes cooperative with the controller for detecting the modulated control light.

15. The device of claim 14, wherein the spatial light modulator, the second controller and the photodiodes are enclosed in a package having a window; the array elements are located for receipt and reflection of the projection light through the window; and the photodiodes are located for receipt of the modulated control light through the window.

16. A method of imaging, comprising:
   receiving image pixel state configuration data wirelessly over an optical link as modulated light from a source of control-modulated light;
   in response to receipt of such data, setting states of individual ones of light modulating elements of an array of light modulating elements of a spatial light modulator; and
   modulating light from a source of projection light with the light modulating elements set to the states for projecting an image.

17. The method of claim 16, further comprising also receiving control signals wirelessly over the optical link from the source of control-modulated light.

18. The method of claim 16, wherein receiving the data includes detecting the control-modulated light with one or more photodetectors located on a common substrate with the light modulating elements.

19. The method of claim 18, wherein the common substrate is enclosed in a package having a window; the array elements are mirrors that receive and reflect the projection light through the window; and the photodetectors are photodiodes that receive the control-modulated light through the window.

20. The method of claim 16, wherein the image pixel state configuration data is received over the optical link as modulated non-visible light.

* * * * *